Aug. 5, 1969    W. J. WIECHEC    3,458,927
METHOD FOR IMPROVING THE SWITCHING COEFFICIENT OF FERRITES
WITH HYSTERESIS LOOPS OF RECTANGULAR SHAPE
Filed Nov. 15, 1965
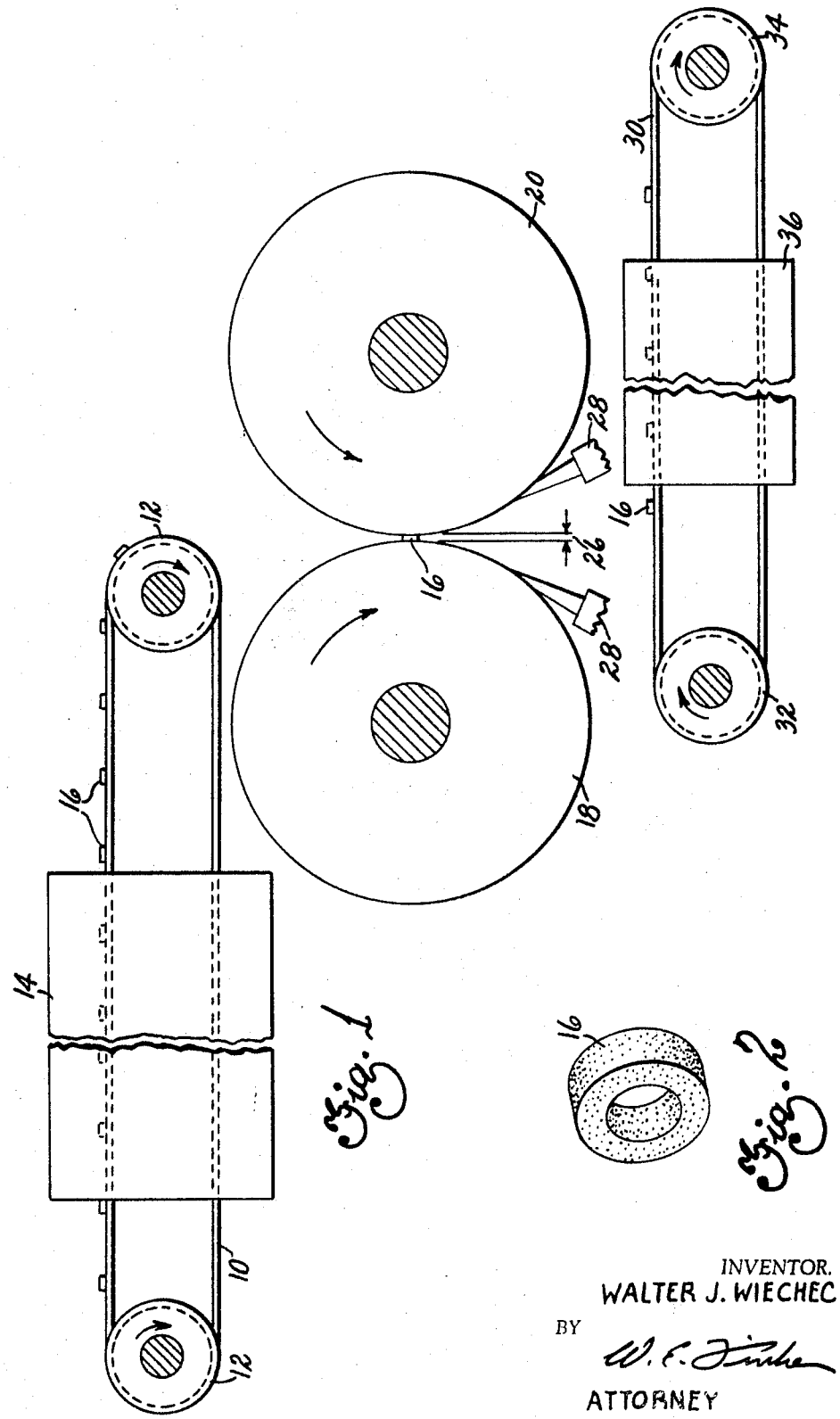
INVENTOR.
WALTER J. WIECHEC
BY
*W. E. Finke*
ATTORNEY

United States Patent Office 3,458,927
Patented Aug. 5, 1969

3,458,927
METHOD FOR IMPROVING THE SWITCHING COEFFICIENT OF FERRITES WITH HYSTERESIS LOOPS OF RECTANGULAR SHAPE
Walter J. Wiechec, Santry, Dublin, Ireland, assignor to General Motors Corporation, Detroit, Mich., a corporation of Delaware
Filed Nov. 15, 1965, Ser. No. 507,908
Int. Cl. B22f 3/24
U.S. Cl. 29—604                          7 Claims

ABSTRACT OF THE DISCLOSURE

A method of making ferrite bodies having a shortened switching time for use in computers and the like is disclosed. The ferrite metal oxide powder is compacted in a mold to form a body. The body is then partially sintered in a furnace and removed therefrom. The partially sintered ferrite body is then pressed between heated rolls to complete the sintering thereof. After being hot pressed the ferrite bodies are annealed to relieve the stresses created by hot pressing to produce a square loop ferrite body having fast switching time characteristics.

---

This invention pertains to ferrites with square or rectangularly-shaped hysteresis loops, hereinafter referred to as square loop ferrites, and more particularly to a method of making square loop ferrite bodies so as to reduce the switching time thereof.

Square loop ferrite bodies in the form of toroids are extensively used in computers for pulse storage, or memory, purposes and switching. Experiments have proven that the switching time of square loop ferrite bodies is substantially directly proportional to the grain size, and hence in order to reduce the switching time, the grain size in the square loop ferrite bodies should be kept as low as possible, preferably less than one micron.

The present invention relates to an improved method of making dense, small grained loop ferrite bodies which readily lends itself to high production purposes. Accordingly, among my objects are the method of making dense fine grained, fast switching square loop ferrite bodies; the further provision of a method of making fast switching square loop ferrite bodies including a hot pressing step to produce densification and complete the sintering without grain growth; and the still further provision of a method of making fast switching square loop ferrite bodies wherein the ferrite bodies are only partially sintered before hot pressing and thereafter annealed to relieve the stresses resulting from hot pressing.

The aforementioned and other objects are accomplished in the present invention by mixing calcined metallic oxide powders with a binder and compacting the same in a mold to form a body. The bodies are then partially sintered in a furnace and removed in an under-fired condition with many voids and small grains. These partially sintered bodies are thereafter pressed between heated rolls and thereafter annealed to remove stresses, after which they are slowly cooled to room temperature. By following this procedure dense small grained square loop ferrite bodies can be economically produced having switching times on the order of .39 microseconds or less.

Further objects and advantages of the present invention will be apparent from the following description, reference being had to the accompanying drawings, wherein a preferred embodiment of the invention is clearly shown.

In the drawings:
FIGURE 1 is a fragmentary schematic illustration, partly in section and partly in elevation, of apparatus suitable for carrying out the method of the present invention.

FIGURE 2 is a perspective view of a square loop ferrite toroid.

The various compositions of square loop ferrites are well known in the art. The present invention is directed to a method of improving the switching time of square loop ferrite bodies of known compositions comprising a mixture of ferric oxide and one or more oxides of manganese, magnesium, lithium, zinc, or nickel.

The usual techniques employed in the production of square loop ferrites involve the mixing of commercially pure fine particles of oxides of the desired metals in the desired proportions. Such mixing may be accomplished by wet ball milling to form a slurry which is thereafter dried. The resulting dried cake is ground to a fine powder which is placed in a suitable container and calcined in air at temperatures between 1100° F. to 1800° F. for a time interval between one-half hour and three hours. The actual temperatures and times employed vary, of course, with the compositions involved.

After calcining the material is again milled and has added thereto suitable binders and lubricants to facilitate subsequent molding and compaction. Ordinarily the square loop ferrite bodies are molded in the form of a toroid and then placed in a furnace in which they are sintered. Dependent upon the composition of the ferrite, the ferrite toroids are sintered at temperatures between 1900° F. to 2750° F. for a time interval ranging from one-half hour to two hours. After sintering, the ferrite toroid is removed from the furnace and air cooled to room temperature.

In accordance with my improved method, the ferrite bodies are only partially sintered in the furnace after molding and compaction. For example, lithium ferrite bodies are partially sintered in a furnace at a temperature of approximately 1900° F. for a time interval of about one hour, and at this time the bodies are under-fired and have many voids and small grains. The partially sintered ferrite bodies are removed from the furnace and quickly passed between heated rolls of either steel or ceramic having a spacing a few mils less than the thickness of the bodies to complete the sintering thereof. After being hot pressed, the ferrite bodies are annealed for stress relief and thereafter slowly cooled in air to room temperature.

Referring to the drawing, a suitable apparatus for carrying out the improved method of this invention may comprise a continuous platinum belt 10 arranged between and driven by the spaced rollers 12, which belt passes through a sintering furnace 14. After being partially sintered in the furnace 14, the ferrite bodies 16 are dropped between heated rolls 18 and 20 driven by oppositely rotating shafts 22 and 24, respectively. The space 26 between the rolls 18 and 20 is a few mils less than the thickness of the ferrite bodies 16, and the temperature of the rolls is maintained between 550° F. and 1700° F. and at preferably 1700° F. so as to hot press the ferrite bodies 16 as they drop off the platinum belt 10 and pass between the rolls 18 and 20. The hot pressing step completes the sintering and densifies the ferrite bodies without increasing the grain size. Scrapers 28 are used to remove the ferrite bodies 16 from the rolls after hot pressing, after which the hot pressed ferrite bodies 16 fall onto a second platinum conveyor belt 30 which extends between and is driven by rollers 32 and 34. The platinum belt 30 passes through an annealing furnace 36 which is maintained at a temperature of approximately 1500° F. The hot pressed ferrite bodies are annealed for an interval of about fifteen minutes and then are slowly air cooled to room temperature.

It is important to note that the spacing of the rolls 18 and 20 must be such that the ferrite bodies will not be crushed or broken. The annealing step is necessary to relieve stresses which are created in the ferrite bodies during the hot pressing step. By only partially sintering the ferrite bodies in the furnace and thereafter hot pressing, densification without grain growth occurs since the hot pressing step compresses the grains together and completes the sintering. In this manner the square loop ferrite bodies can be produced having a faster switching time than square loop ferrites made in the conventional manner wherein the ferrite bodies are completely sintered in a furnace. Moreover, the method comprehended by this invention lends itself to continuous production of fast switching square loop ferrite bodies.

While the embodiment of the invention as herein disclosed constitutes a preferred form, it is to be understood that other forms might be adopted.

What is claimed is as follows:

1. A method of producing fast switching square loop ferrite bodies comprising the steps of preparing a mixture of metallic oxides, forming a compacted molded body from said mixture, partially sintering the body, hot pressing the partially sintered ferrite body, and thereafter annealing the ferrite body to relieve the stresses created by hot pressing to produce a fast switching square loop ferrite body.

2. The method of claim 1 in which said partially sintered ferrite body is hot pressed by passing it between rolls which are spaced apart a few mils less than the thickness of said body.

3. The method set forth in claim 2 wherein the temperature of said rolls is maintained between 550° F. and 1700° F.

4. The method set forth in claim 1 wherein said ferrite body is annealed at a temperature of 1500° F.

5. The method set forth in claim 4 wherein said bodies are annealed for a period of about fifteen minutes.

6. The method of claim 1 wherein sintering of the body is completed during the hot pressing step.

7. The method of claim 1 wherein the ferrite body is densified and sintering is completed without grain growth during the hot pressing step.

References Cited

UNITED STATES PATENTS

| | | | |
|---|---|---|---|
| 2,535,025 | 12/1950 | Albers-Schoenberg | 29—608 X |
| 2,682,021 | 6/1954 | Elmen | 29—607 |
| 3,110,675 | 11/1963 | Brailowsky | 29—607 |

PAUL M. COHEN, Primary Examiner

U.S. Cl. X.R.

29—420, 608